United States Patent
Ishikawa et al.

(10) Patent No.: US 7,581,606 B2
(45) Date of Patent: Sep. 1, 2009

(54) VEHICULAR CONTROL DEVICE

(75) Inventors: Tetsuhiro Ishikawa, Nishikamo-gun (JP); Hiroshi Yoshida, Chiryuu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 180 days.

(21) Appl. No.: 11/666,334

(22) PCT Filed: Nov. 22, 2005

(86) PCT No.: PCT/JP2005/021945

§ 371 (c)(1),
(2), (4) Date: Apr. 26, 2007

(87) PCT Pub. No.: WO2006/064662

PCT Pub. Date: Jun. 22, 2006

(65) Prior Publication Data

US 2008/0115985 A1    May 22, 2008

(30) Foreign Application Priority Data

Nov. 24, 2004    (JP) ............................. 2004-338788

(51) Int. Cl.
*B60K 6/20* (2007.10)

(52) U.S. Cl. .............................. 180/65.21; 180/65.265; 903/910

(58) Field of Classification Search ............... 180/65.2, 180/65.1, 65.8, 65.6, 197, 279, 249, 65.21, 180/65.265, 65.275, 65.31; 318/400.04, 318/9, 140; 701/22, 102; 903/910, 918, 903/923; 475/2, 5, 211

See application file for complete search history.

(56) References Cited

U.S. PATENT DOCUMENTS

| 5,650,713 | A |   | 7/1997 | Takeuchi et al. | |
|---|---|---|---|---|---|
| 5,789,877 | A | * | 8/1998 | Yamada et al. | 318/9 |
| 5,904,631 | A | * | 5/1999 | Morisawa et al. | 475/5 |
| 5,909,094 | A | * | 6/1999 | Yamada et al. | 318/140 |
| 5,942,862 | A | * | 8/1999 | Yamada et al. | 318/9 |
| 6,018,694 | A | * | 1/2000 | Egami et al. | 701/102 |
| 6,048,289 | A | * | 4/2000 | Hattori et al. | 477/15 |
| 6,053,833 | A | * | 4/2000 | Masaki | 475/2 |
| 6,083,138 | A | * | 7/2000 | Aoyama et al. | 477/5 |
| 6,346,784 | B1 | * | 2/2002 | Lin | 318/9 |
| 6,447,422 | B1 | * | 9/2002 | Haka | 475/211 |
| 6,527,659 | B1 | * | 3/2003 | Klemen et al. | 475/5 |

(Continued)

FOREIGN PATENT DOCUMENTS

JP    A 07-336810    12/1995

(Continued)

*Primary Examiner*—Hau V Phan
(74) *Attorney, Agent, or Firm*—Oliff & Berridge, PLC

(57) ABSTRACT

An ECU executes a program including the steps of: if an accelerator pedal position P is larger than a predetermined accelerator pedal position, calculating an output that an MG(2) is required to provide; calculating an output that a capacitor and a battery can supply; calculating an output that can be supplied to MG(1), by subtracting the output that the MG(2) is required to provide from the output that the capacitor and the battery can supply; calculating a torque that each MG is instructed to output, as based on the output that can be supplied to MG(1) and the output that an MG(2) is required to provide; and controlling inverters (1) and (2), as based on the torque that each MG is instructed to output, to accelerate the vehicle.

8 Claims, 7 Drawing Sheets

U.S. PATENT DOCUMENTS

| | | | |
|---|---|---|---|
| 6,672,415 B1 * | 1/2004 | Tabata | 180/65.2 |
| 6,851,537 B2 * | 2/2005 | Bowen | 180/249 |
| 6,938,606 B2 * | 9/2005 | Chung et al. | 123/198 DB |
| 7,028,795 B2 * | 4/2006 | Tabata | 180/65.2 |
| 7,099,756 B2 * | 8/2006 | Sato | 701/22 |
| 7,107,956 B2 * | 9/2006 | McGee et al. | 180/65.2 |
| 7,212,891 B2 * | 5/2007 | Sato | 701/22 |
| 7,233,120 B2 * | 6/2007 | Romero Pintado et al. | 318/400.04 |
| 7,445,066 B2 * | 11/2008 | Hommi et al. | 180/65.2 |

FOREIGN PATENT DOCUMENTS

| | | |
|---|---|---|
| JP | A 09-271103 | 10/1997 |
| JP | A 10-238380 | 9/1998 |
| JP | A 10-285800 | 10/1998 |
| JP | A 11-332013 | 11/1999 |
| JP | A 2000-115913 | 4/2000 |
| JP | A 2001-128307 | 5/2001 |
| JP | A 2001-224102 | 8/2001 |
| JP | A 2001-317385 | 11/2001 |
| JP | A 2002-106378 | 4/2002 |
| JP | A 2002-325377 | 11/2002 |
| JP | A 2003-120263 | 4/2003 |
| JP | A 2003-148310 | 5/2003 |
| JP | A 2004-015866 | 1/2004 |
| JP | A 2004-052851 | 2/2004 |

* cited by examiner

VEHICULAR CONTROL DEVICE

TECHNICAL FIELD

The present invention relates generally to vehicular control devices and particularly to the technology applied to control hybrid vehicles capable of running by a driving force received from a rotating electric machine as well as that received from an engine.

BACKGROUND ART

In recent years, as part of an approach to address environmental issues, a hybrid vehicle capable of running by a driving force received from a rotating electric machine is increasingly gaining attention. When such hybrid vehicle is to be accelerated, it utilizes a driving force received from the engine to gain acceleration, generate power supplied to the rotating electric machine, and the like. Accordingly it requires a rapidly increased number of rotations of the engine.

Japanese Patent Laying-open No. 10-238380 discloses a control device for a hybrid vehicle that allows improved responsiveness of its engine in a transient operation of the vehicle. More specifically, as described in Japanese Patent Laying-open No. 10-238380, the control device for a hybrid vehicle controls a hybrid vehicle including an engine, a power conversion unit coupled to the engine and including first and second rotating electric machines, an inverter device for driving the first and second rotating electric machines, and an electric storage device electrically connected to the inverter device. The control device controls a torque output from the engine, as based on information of how the vehicle is operated, and the control device also controls the value of a torque that the first and second rotating electric machines are controlled to generate, as based on the amount by which the torque that the engine outputs is controlled and a target number of rotations of the engine that corresponds to a characteristic of the engine. The control device includes a detection unit detecting a transient state, and a torque correction unit. The detection unit detecting a transient state detects those transient states of the vehicle which correspond to the vehicle's acceleration and deceleration. If a transient state detected as a result indicates that the vehicle is accelerated, the torque correction unit makes a correction to decrease the value of a torque that the first rotating electric machine is instructed to output, and also makes a correction to increase the value of a torque that the second rotating electric machine is instructed to output. If the transient state detected as a result indicates that the vehicle is decelerated, the torque correction unit makes a correction to increase the value of a torque that the first rotating electric machine is instructed to output, and also makes a correction to decrease the value of a torque that the second rotating electric machine is instructed to output.

As described in the publication, the control device for a hybrid vehicle is provided such that the engine rotates with the first rotating electric machine acting as a load. If in such a case the vehicle is accelerated, and the value of a torque that the first rotating electric machine is instructed to output is corrected to decrease, the load of the engine is alleviated by that decrease, and this facilitates increasing the number of rotations of the engine. At the time, the value of a torque that the second rotating electric machine is instructed to output is corrected to increase, and the vehicle's running performance will not be impaired. In contrast, if the vehicle is decelerated, and the value of a torque that the first rotating electric machine is instructed to output is corrected to increase, the load of the engine is increased by that increase, and this facilitates decreasing the number of rotations of the engine. At the time, the value of a torque that the second rotating electric machine is instructed to output is corrected to decrease, and the vehicle is braked appropriately. Thus if the engine is in the transient operation, poor emission, an output of the engine accidentally reduced, and other disadvantages can be resolved. As a result the engine can provide an output as required, and thus be improved in responsiveness.

If the engine and the first and second rotating electric machines are coupled in some manner, decreasing the first rotating electric machine in torque when the vehicle is accelerated, as done by the control device for a hybrid vehicle, as described in Japanese Patent Laying-open No. 10-238380, can increase the engine's load. For example, if the engine is coupled to a carrier of a planetary gear, and the first and second rotating electric machines are coupled to a sun gear and a ring gear, respectively, then, as indicated in the nomographic chart of FIG. 7 by a solid line, the first and second rotating electric machines have their respective numbers of rotations in a relationship bound by a straight line. If in such a case the first rotating electric machine decreases in torque and hence the number of rotations, then, as indicated in FIG. 7 by a chained line, the first rotating electric machine acts as a load and the engine has its number of rotations pulled down. As such, when the vehicle is accelerated, the engine cannot provide increased driving force, and as a result, acceleration as desired may not be obtained.

DISCLOSURE OF THE INVENTION

The present invention has been made to overcome the above disadvantage and it contemplates a vehicular control device that allows a vehicle to be improved in acceleratability.

The present control device for a vehicle includes: an engine; a first rotating electric machine coupled to the engine; a second rotating electric machine coupled to the engine; a battery; a capacitor provided electrically in parallel with the battery; and a control unit causing the battery and the capacitor to supply power to increase a number of rotations of the second rotating electric machine and also controlling the first rotating electric machine and the second rotating electric machine to prevent the first rotating electric machine from acting as a load of the engine when the vehicle is accelerated as a driving force of the engine is transmitted to a driving wheel.

In accordance with the present invention, in accelerating a vehicle when the engine's motive power is being transmitted to a driving wheel a battery and a capacitor supply a second rotating electric machine with electric power to increase the number of rotations of the second rotating electric machine. As the battery and the capacitor supply the second rotating electric machine with electric power the second rotating electric machine can be supplied with sufficient electric power. In particular, the capacitor is excellent in instant output, and can supply the second rotating electric machine with electric power with fast responsiveness. The second rotating electric machine can thus provide a driving force to accelerate the vehicle. The first rotating electric machine is controlled so that it does not act as a load of the engine. This allows the engine to provide a rapidly increased number of rotations. The engine and the second rotating electric machine can thus provide driving force to accelerate the vehicle. Consequently a control device for a vehicle can be provided that can improve the vehicle in acceleratability.

Preferably the control device for a vehicle further includes: a first calculation unit for calculating an output that the second rotating electric machine is required to provide; a second calculation unit for calculating an output provided from the battery and the capacitor; and a third calculation unit for calculating an output of the first rotating electric machine by subtracting the output that the second rotating electric machine is required to provide from the output provided from the battery and the capacitor. The control unit controls the first rotating electric machine, as based on the output of the first rotating electric machine, to increase a number of rotations of the engine.

In accordance with the present invention an output that the second rotating electric machine is required to provide is subtracted from that of the battery and capacitor to calculate that of the first rotating electric machine. In accordance with the output of the first rotating electric machine calculated the first rotating electric machine is controlled. Thus the output that the second rotating electric machine is required to provide is ensured, while an extra output can be used to increase the output of the first rotating electric machine. This can prevent the second rotating electric machine from providing insufficient output, while the first rotating electric machine can provide an output to increase the number of rotations of the engine. Consequently the engine and the second rotating electric machine can provide driving force to rapidly accelerate the vehicle.

Still preferably when the engine attains a predetermined number of rotations the control unit controls the first rotating electric machine to decrease a torque generated from the first rotating electric machine.

In accordance with the present invention when the number of rotations of the engine is increased to attain that of rotations required for acceleration the torque generated from the first rotating electric machine is decreased. This can prevent unnecessary power consumption.

Still preferably the control device for a vehicle further includes a power split device including a sun gear, a pinion gear engaging with the sun gear, a carrier supporting the pinion gear rotatably as desired, and a ring gear engaging with the pinion gear. The engine is coupled to the carrier. The first rotating electric machine is coupled to the sun gear. The second rotating electric machine is coupled to the ring gear.

In accordance with the present invention the engine and the first and second rotating electric machines have their respective numbers of rotations bound by a straight line in a nomographic chart. In a vehicle having such relationship the number of rotations of the engine can rapidly be increased to improve acceleration.

Still preferably the rotating electric machine is a motor generator.

In a fifth invention a vehicle having the motor generator mounted therein can be improved in acceleratability

BEST MODES FOR CARRYING OUT THE INVENTION

Figure 1:
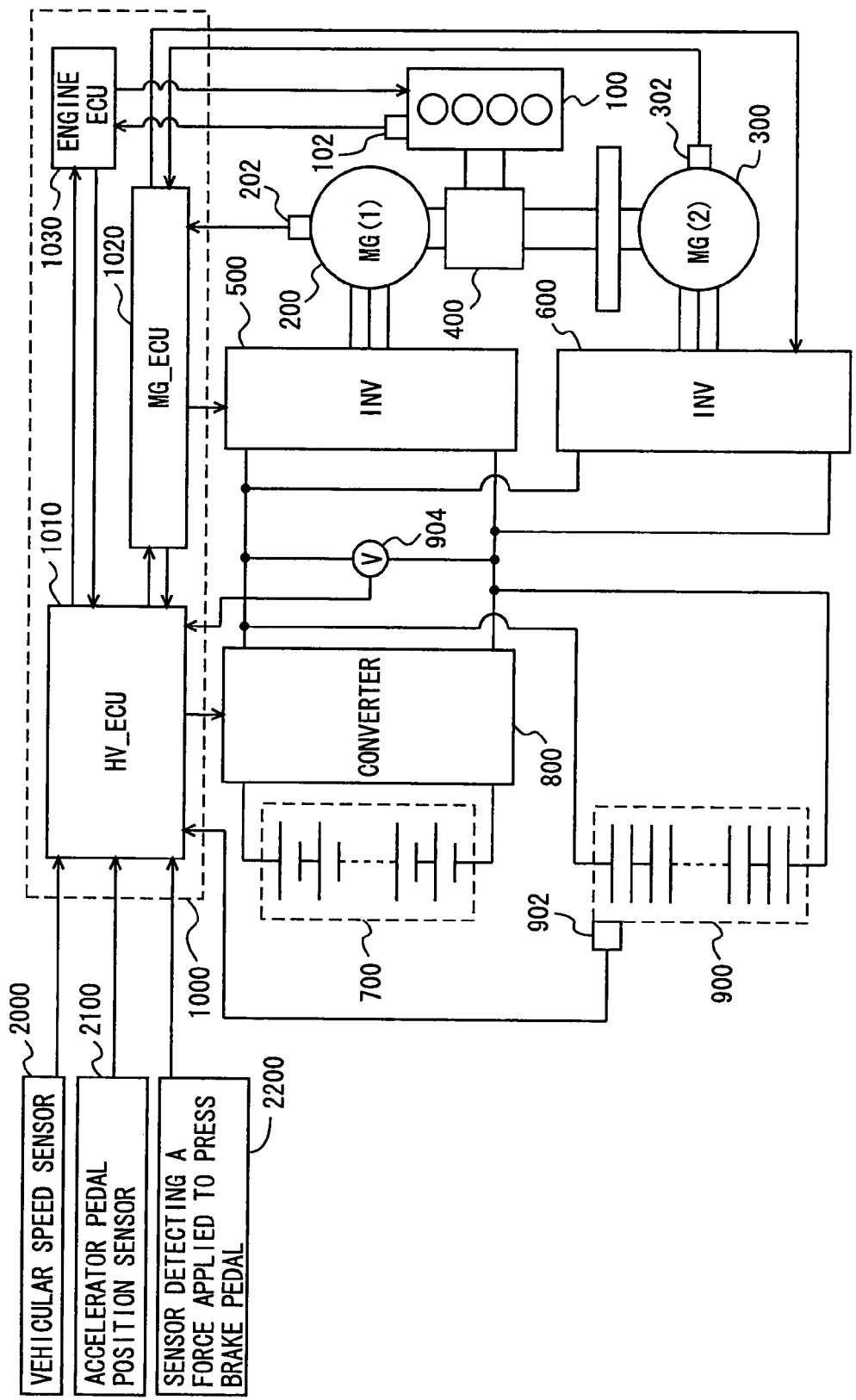
FIG. 1 schematically shows a configuration of a hybrid vehicle having a control device mounted therein in accordance with an embodiment of the present invention.

Hereinafter reference will be made to the drawings to describe an embodiment of the present invention. In the following description, identical components are denoted by identical reference characters. Their names and functions are also identical. Accordingly they will not be described repeatedly.

With reference to FIG. 1, the present embodiment provides a control device mounted in a hybrid vehicle as will be described hereinafter. The vehicle includes an engine 100, motor generators (MGs)(1) 200 and (2) 300, a power split device 400, inverters (1) 500 and (2) 600, a battery 700, a converter 800, and a capacitor 900. The vehicle is run by a driving force received from at least one of engine 100 and MG(2) 300.

Engine 100 and MGs(1) 200 and (2) 300 are connected via power split device 400. Engine 100 generates motive power, which is split by power split device 400 into two routes. One route is that driving a wheel (not shown) via a reducer. The other route is that driving MG(1) 200 to generate electric power.

MG(1) 200 is a three phase, alternate current motor. MG(1) 200 generates power on the motive power of engine 100 that is split by power split device 400. The electric power generated by MG(1) 200 is selectively used depending on how the vehicle is running, the state of charge (SOC) of battery 700, and the like. For example if the vehicle is normally running, the power generated by MG(1) 200 is exactly used as power to drive MG(2) 300. If battery 400 has an SOC lower than a predetermined value, the power generated by MG(1) 200 is converted by inverter 500 from alternate current to direct current. Subsequently the power is adjusted by converter 800 in voltage and thus stored to battery 700, or is not adjusted in voltage and is thus stored to capacitor 900.

If MG(1) 200 acts as a power generator, MG(1) 200 generates a negative torque. Herein a negative torque refers to a torque that acts as a load of engine 100. In contrast, as will be described later, if MG(1) 200 receives electric power and thus acts as a motor, MG(1) 200 generates a positive torque. Herein a positive torque refers to a torque that does not act as a load of engine 100. In other words, a positive torque refers to a torque that assists engine 100 to rotate. MG(2) 300 is similarly discussed.

MG(2) 300 is a three phase, alternate current motor. MG(2) 300 is driven on at least one of the electric power stored in battery 700, that stored in capacitor 900, and that generated by MG(1) 200. MG(2) 300 receives electric power converted by inverter (2) 600 from alternate current to direct current.

MG(2) 300 provides a driving force, which is transmitted via the reducer to the wheel. MG(2) 300 thus assists engine 100, provides the driving force to run the vehicle, and the like.

When the hybrid vehicle is regeneratively braked, MG(2) 300 is driven by the wheel via the reducer and thus operated as a power generator. MG(2) 300 thus acts as a regenerative brake converting braking energy to electric power. MG(2) 300 thus generates electric power, which is stored via inverter (2) 600 to battery 700, or is stored to capacitor 900.

Battery 700 is a set of batteries configured of a plurality of series connected battery modules each formed of a plurality of battery cells integrated together. The voltage applied to discharge battery 700 and that applied to charge battery 700 are adjusted by converter 800. Capacitor 900 is configured of a plurality of cells connected in parallel. Note that to enhance voltage endurance, some of the cells may be connected in series to configure capacitor 900.

Engine 100, inverters (1) 500 and (2) 600 and converter 800 are controlled by an electronic control unit (ECU) 1000. ECU 1000 includes a hybrid vehicle (HV)_ECU 1010, an MG_ECU 1020, and an engine ECU 1030.

HV_ECU 1010 receives a signal from a temperature sensor 902 indicating the temperature of capacitor 900, and a signal from a voltmeter 904 indicating the voltage of capacitor 900. Furthermore HV_ECU 1010 receives a signal from a vehicular speed sensor 2000 indicating a vehicular speed, a signal from an accelerator pedal position sensor 2100 indicating the position of an accelerator pedal (not shown), and a signal from a sensor 2200 indicating a force applied to press a brake pedal.

MG_ECU 1020 receives a signal from a sensor 202 indicating the number of rotations of MG(1) 200 and a signal from a sensor 302 indicating the number of rotations of MG(2) 300. Engine ECU 1030 receives a signal from a sensor 102 indicating the number of rotations of engine 100.

HV_ECU 1010, MG_ECU 1020 and engine ECU 1030 are connected to be capable of mutually transmitting and receiving signals. HV_ECU 1010 calculates outputs that engine 100 and MGs(1) 200 and (2) 300 are required to provide, as based on a signal input to each ECU and a program and a map stored in memory (not shown).

MG_ECU 1020 operates, as based on an output that MGs (1) 200 and (2) 300 are required to provide, to control inverters (1) 500 and (2) 600 to control MGs(1) 200 and (2) 300. Engine ECU 1030 operates, as based on an output that engine 100 is required to provide, to control engine 100.

Figure 2:
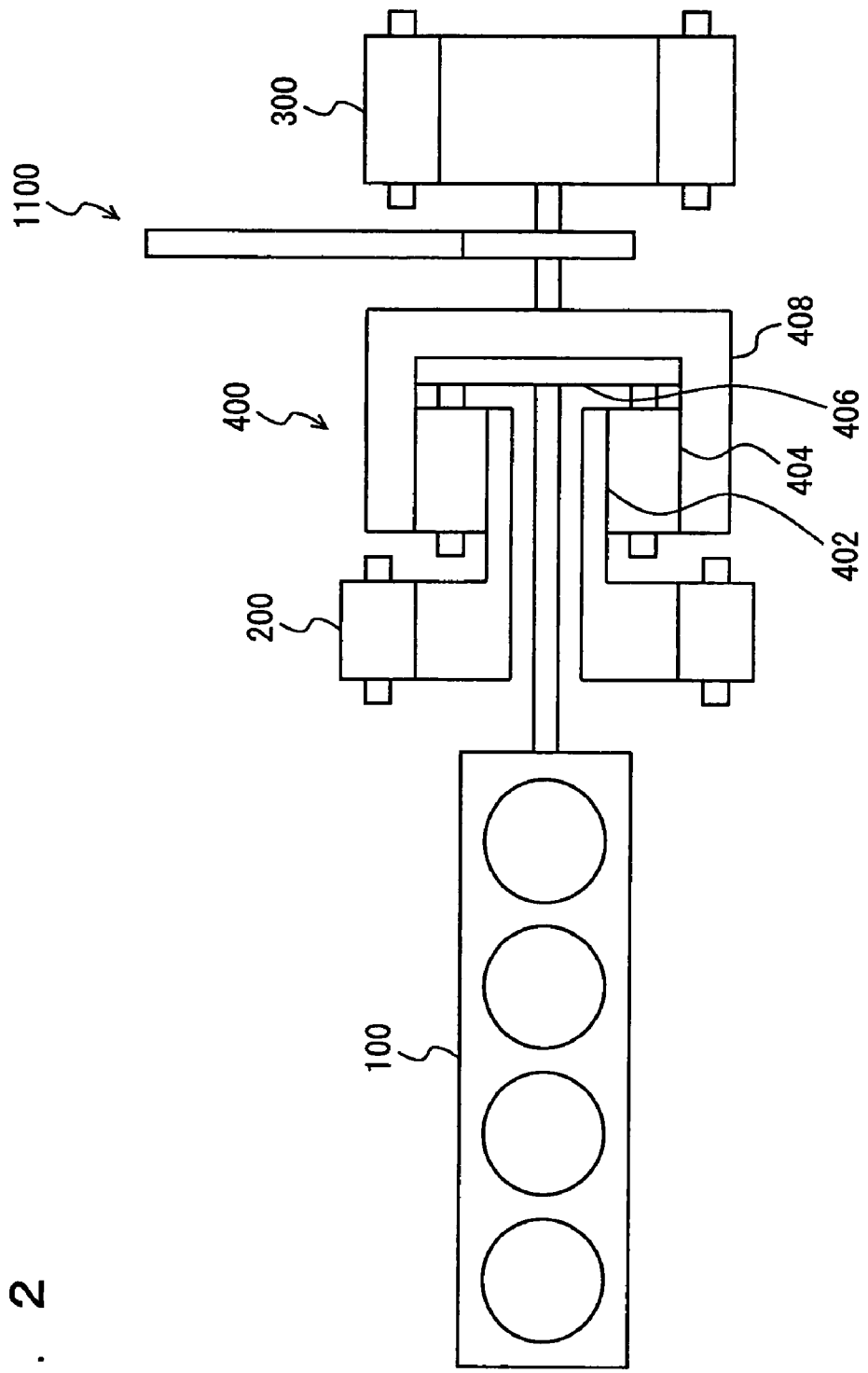
FIG. 2 shows a power split device.

With reference to FIG. 2, power split device 400 will more specifically be described. Power split device 400 is configured of a planetary gear including a sun gear 402, a pinion gear 404, a carrier 406, and a ring gear 408.

Pinion gear 404 engages with sun gear 402 and ring gear 408. Carrier 406 supports pinion gear 404 to be able to revolve. Sun gear 402 is coupled to a shaft of MG(1) 200 serving as an axis of rotation. Carrier 406 is coupled to a crankshaft of engine 100. Ring gear 408 is coupled to a shaft of MG(2) 300 serving as an axis of rotation and to reducer 100.

Figure 3:
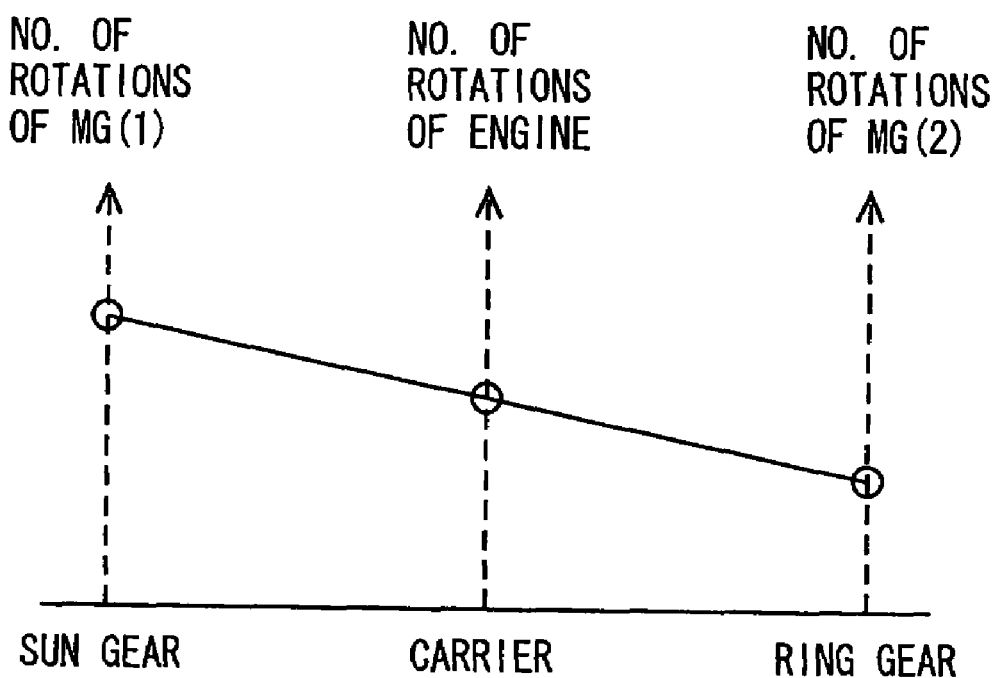
FIG. 3 is a (first) nomographic chart representing a relationship between an engine and MGs(1) and (2) in the number of rotations.

Engine 100 and MGs(1) 200 and (2) 300 coupled via power split device 400 configured of a planetary gear provide their respective numbers of rotations in a relationship bound by a straight line in a nomographic chart, as shown in FIG. 3.

Figure 4:
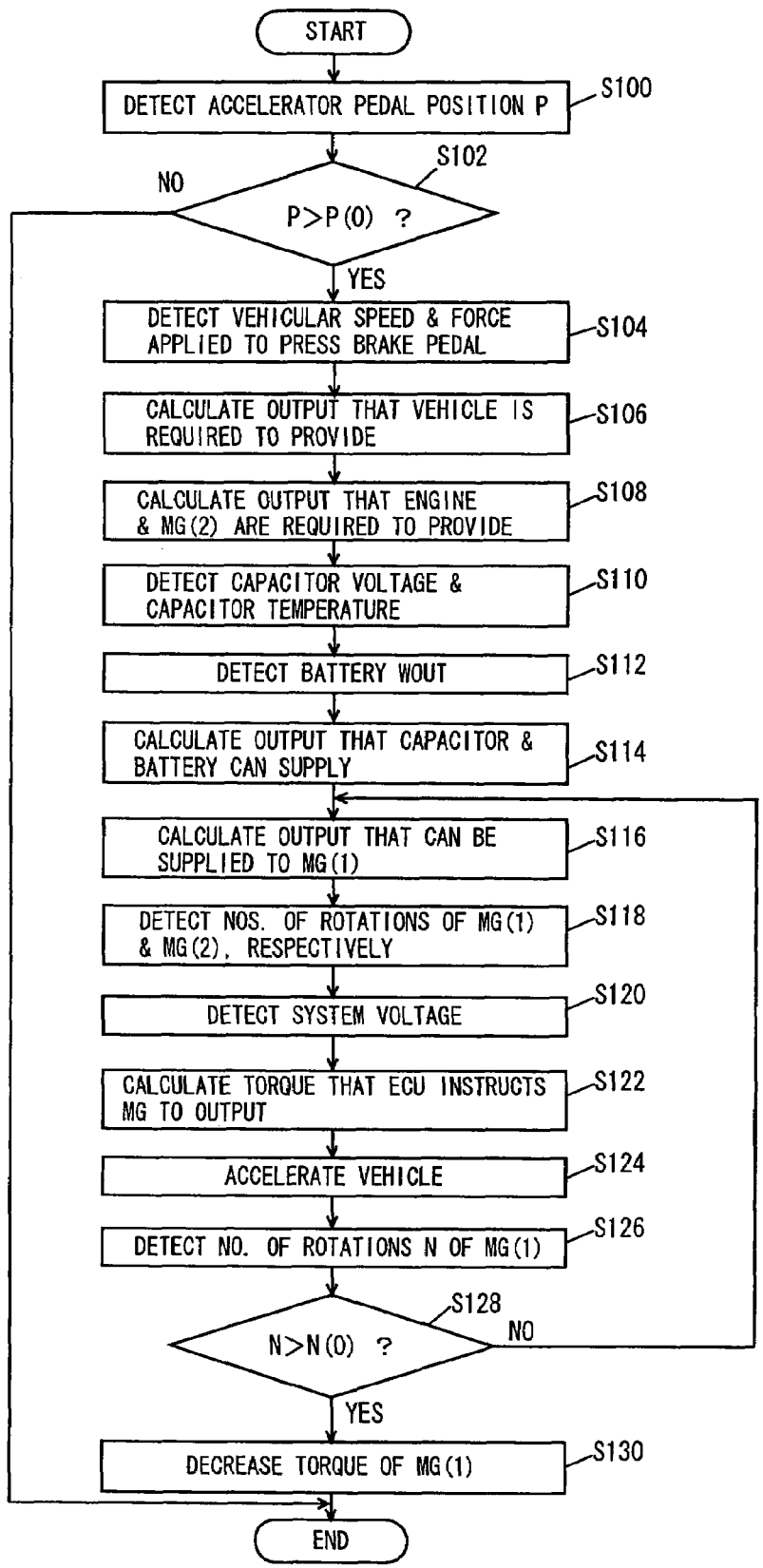
FIG. 4 is a flowchart of a structure of a program executed for control by an ECU implementing the control device in accordance with the present embodiment of the present invention.

With reference to FIG. 4, ECU 1000 implementing the control device of the present embodiment executes a program constructed for control, as described hereinafter.

At step (S) 100 ECU 1000 detects an accelerator pedal position P, as based on a signal transmitted from acceleration pedal position sensor 2100.

At S102 ECU 1000 determines whether accelerator pedal position P is larger than a predetermined accelerator pedal position P(0). If so it can be said that the driver requests to accelerate the vehicle. If accelerator pedal position P is larger than the predetermined accelerator pedal position P(0) (YES at S102), the process proceeds to step S104. Otherwise (NO at S102) the process ends.

At S104 ECU 1000 detects the vehicle's speed and a force applied to press the brake pedal, as based on signals transmitted from vehicular speed sensor 2000 and sensor 2200, respectively.

At S106 ECU 1000 calculates an output that the vehicle requires to provide, that is necessary for acceleration, as based on the accelerator pedal position P, vehicular speed and force applied to press the brake pedal, as detected. At S108 ECU 1000 calculates an output that engine 100 and MG(2) 300 are required to provide, as based on the map stored in the memory.

At S110 ECU 1000 detects the voltage and temperature of capacitor 900, as based on signals transmitted from voltmeter 904 and temperature sensor 902. At S112 ECU 1000 detects a value WOUT indicating a limit of the power that battery 700 discharges. This value is determined by HV_ECU 1010, as based on the temperature, SOC and the like of battery 700. Thus ECU 1000 detects the value from internal to ECU 1000.

At S114 ECU 1000 calculates an output (or power) that capacitor 900 and battery 700 can supply, as based on the voltage and temperature of capacitor 900 and the value indicating the limit of the power that battery 700 discharges.

At S116 ECU 1000 calculates an output (or power) that can be supplied to MG (1) 200, by subtracting the output that MG(2) 300 is required to provide from the output that capacitor 900 and battery 700 can supply.

At S118 ECU 1000 detects the number of rotations of MG(1) 200 and the number of rotations of MG(2) 300, as based on signals transmitted from sensors 202 and 203, respectively, detecting the numbers of rotations.

At S120 ECU 1000 detects a system voltage. Herein the system voltage is equal to the voltage of capacitor 900. Accordingly ECU 1000 detects the system voltage, as based on a signal transmitted from voltmeter 204.

At S122 ECU 1000 calculates a torque that ECU 1000 instructs MG(1) 200 to output, as based on the output that can be supplied to MG(1) 200, the number of rotations of MG(1) 200, and the system voltage, and ECU 1000 calculates a torque that ECU 1000 instructs MG(2) 300 to output, as based on the output that MG(2) 300 is required to provide, the number of rotations of MG(2) 300, and the system voltage. Note that the torques calculated at S122 are positive torques. In other words, the torques are calculated to allow MGs(1) 200 and (2) 300 to assist engine 100.

At S124 ECU 1000 accelerates the vehicle. More specifically, engine ECU 103 controls an output of engine 100, as based on an output that engine 100 is required to provide. To allow MGs(1) 200 and (2) 300 to output the calculated torques that ECU 1000 instructs MGs(1) 200 and (2) 300 to output, MG_ECU 1020 controls inverters (1) 500 and (2) 600 to drive MGs(1) 200 and (2) 300.

At S126 ECU 1000 detects the number of rotations N of MG(1) 200, as based on a signal transmitted from sensor 202. At S128 ECU 1000 determines whether the number of rotations N of MG(1) 200 is larger than a predetermined number of rotations N(0). The predetermined number of rotations N(0) is determined as based on a predetermined target number of rotations of engine 100 and the number of rotations of MG(2) 300. More specifically, if the number of rotations N of MG(1) 200 is larger than the predetermined number of rotations N(0), the number of rotations of engine 100 is larger than the predetermined target number of rotations. The target number of rotations of engine 100 is determined to be a number of rotations allowing the vehicle to attain acceleration as desired.

If the number of rotations N of MG(1) 200 is larger than the predetermined number of rotations N(0) (YES at S128) the process proceeds to S130. Otherwise (NO at S128) the process returns to S116. At S130 ECU 1000 decreases the torque of MG(1) 200. Thereafter the process ends.

In accordance with the aforementioned construction and flowchart, ECU 1000 implementing the control device of the present embodiment operates, as described hereinafter.

When engine (100) has its motive power transmitted to a wheel, accelerator pedal position P is detected (S100). If accelerator pedal position P is larger than the predetermined accelerator pedal position P(0) (YES at S102), i.e., the driver requests to accelerate the vehicle, the current vehicular speed and force applied to press the brake pedal are detected (S104). From the vehicular speed and force applied to press the brake pedal, as detected, an output that the vehicle is required to provide, that is necessary for acceleration, is calculated (S106). From the output that the vehicle is required to provide, an output that engine 100 and MG(2) 300 are required to provide is calculated (S108).

Furthermore, the voltage and temperature of capacitor 900 is calculated (S110) and the value indicating the limit of the power that battery 700 discharges is detected (S112). The voltage, temperature and value as detected are used to calculate an output that capacitor 900 and battery 700 can supply (S114). Subtracting the calculated output that MG(2) 300 is required to provide from the calculated output that capacitor 900 and battery 700 can supply, calculates an output that can be supplied to MG(1) 200 (S116). In other words, an extra output (or power) after the output that MG(1) 200 is required to provide is ensured, is the output that can be supplied to MG(1) 200. Thus MG(2) 300 can be prevented from receiving insufficient electric power.

Subsequently the numbers of rotations of MGs(1) 200 and (2) 300, respectively, are detected (S118) and the system voltage is detected (S120). The number of rotations, the system voltage, the output that can be supplied to MG(1) 200, and the output that MG(2) 300 is required to provide are used to calculate a torque that ECU 1000 instructs each MG to output (S122). More specifically, the torque is calculated to allow MGs(1) 200 and (2) 300 to assist engine 100.

Subsequently engine 100 is controlled in accordance with the output that engine 100 is required to provide, and inverters (1) 500 and (2) 600 are controlled to cause each MG to output the calculated torque that ECU 1000 instructs the MG to provide.

Figure 5:
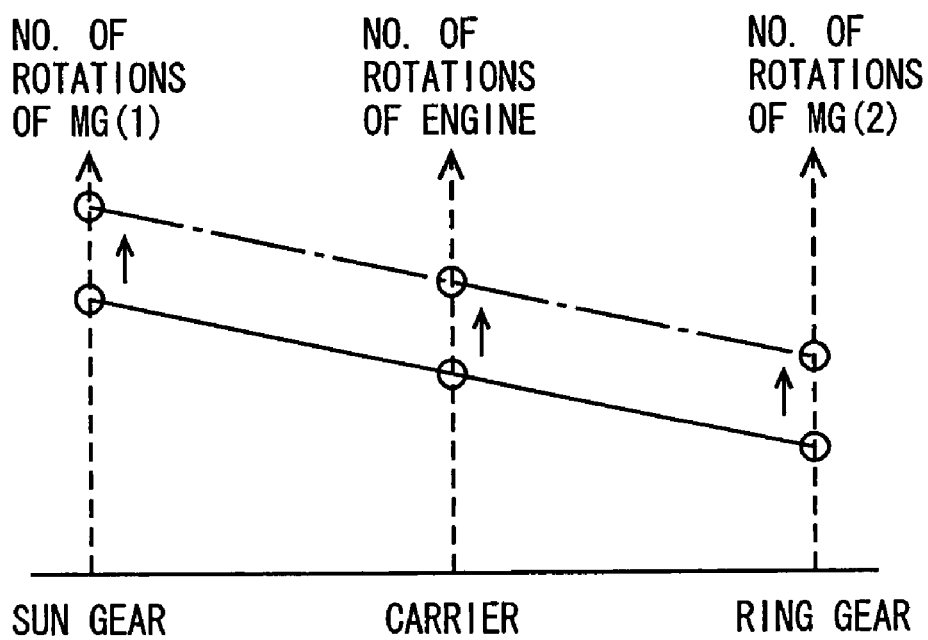
FIG. 5 is a (second) nomographic chart representing a relationship between the engine and MGs(1) and (2) in the number of rotations.

Thus, as indicated in FIG. 5 by a chained line, MGs(1) 200 and (2) 300 have their respective numbers of rotations increased to be larger than those indicated by a solid line. Thus MG(1) 200 does not act as a load of engine 100. Accordingly, engine 100 can provide a rapidly increasing number of rotations. Thus, as shown in FIG. 6, rapidly increased acceleration is obtained to allow the vehicle to be accelerated as desired (S124).

At the time, MGs(1) 200 and (2) 300 receive electric power from both battery 700 and capacitor 900. In particular, capacitor 900 is superior to battery 700 in instant output performance. MGs(1) 200 and (2) 300 can thus receive sufficient electric power.

Figure 6:
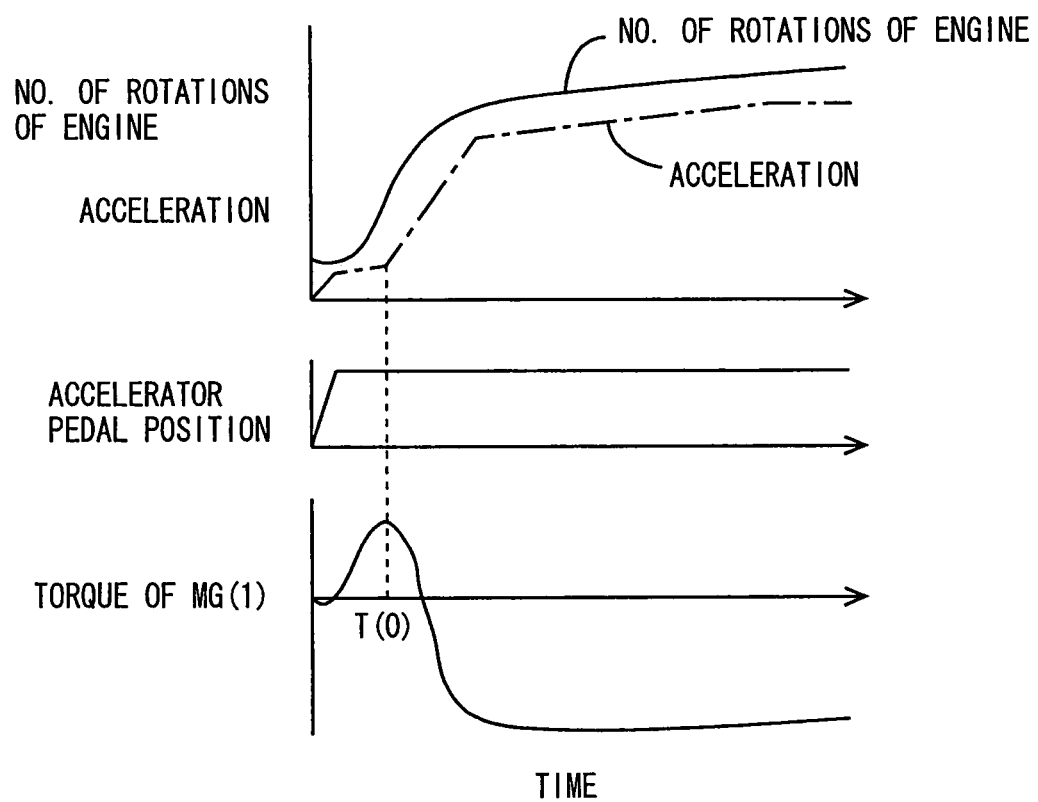
FIG. 6 is timing plots representing how the number or rotations of the engine, and acceleration transition.
Figure 7:
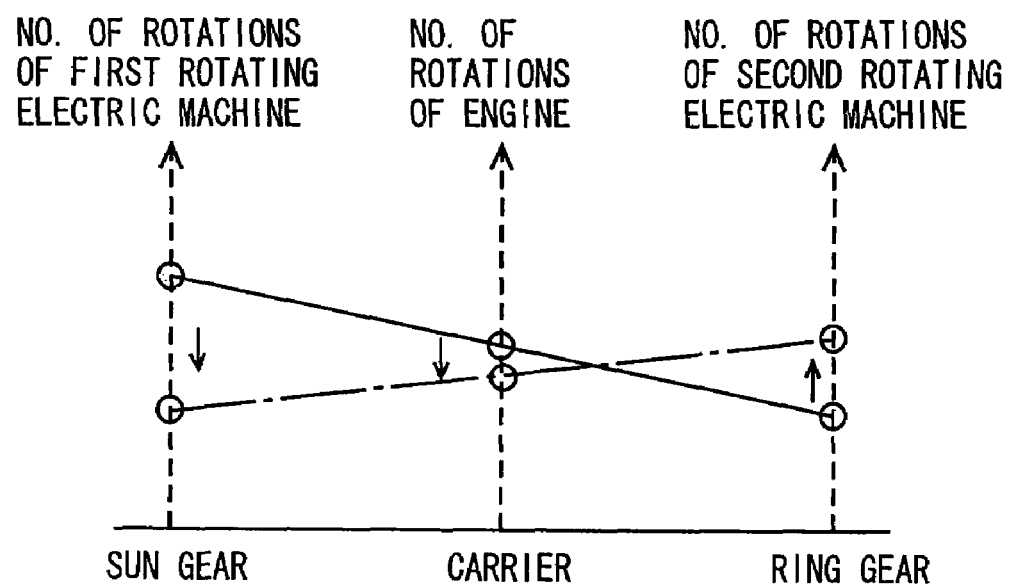
FIG. 7 is a nomographic chart representing a relationship between an engine and first and second rotating electric machines in the number of rotations.

In acceleration, the number of rotations N of MG(1) 200 is detected (S126), and if at a time T(0) shown in FIG. 6 the number of rotations N of MG(1) 200 is larger than the predetermined number of rotations N(0) (YES at S128), it can be said that the number of rotations of engine 100 is increased as high as the target number of rotations satisfying desired acceleration.

In that case, the torque of MG(1) 200 is decreased. This can reduce unnecessary power consumption. Furthermore, ultimately, the torque of MG(1) 200 becomes a negative torque. If the torque of MG(1) 200 is a negative torque, MG(1) 200 acts as a power generator. Thus, after the number of rotations of engine 100 is increased to be sufficiently high, the electric power generated by MG(1) 200 is used to drive MG(2) 300 and thus accelerate the vehicle.

Thus when a vehicle is to be accelerated the control device or ECU of the present embodiment allows a capacitor and a battery to supply MGs(1) and (2) with electric power to allow MGs(1) and (2) to provide an increased output. This can prevent MG(1) from acting as a load of the engine and thus increase the number of rotations of the engine to accelerate the vehicle by a driving force received from the engine and MG(2).

Note that in the above embodiment, when a vehicle is to be accelerated the torque of MG(1) 200 is increased. Alternatively, when the vehicle is accelerated the torque of MG(1) 200 may be 0. In this case also MG(1) 200 does not act as a load of the engine. Thus engine 100 provides a number of rotations increased by the output of engine 100 per se.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A control device for a vehicle, comprising:
    an engine;
    a first rotating electric machine coupled to the engine;
    a second rotating electric machine coupled to the engine;
    a battery;
    a capacitor provided electrically in parallel with the battery;
    a first calculation unit for calculating an output that the second rotating electric machine is required to provide;
    a second calculation unit for calculating an output provided from the battery and the capacitor;
    a third calculation unit for calculating an output of the first rotating electric machine by subtracting the output that the second rotating electric machine is required to provide from the output provided from the battery and the capacitor; and
    a control unit causing the battery and the capacitor to supply power to increase a number of rotations of the second rotating electric machine and also controlling the first rotating electric machine and the second rotating electric machine to prevent the first rotating electric machine from acting as a load of the engine when the vehicle is accelerated as a driving force of the engine is transmitted to a driving wheel, wherein the control unit controls the first rotating electric machine, as based on the output of the first rotating electric machine, to increase a number of rotations of the engine.

2. The control device for a vehicle, according to claim 1, wherein when said engine attains a predetermined number of rotations said control unit controls said first rotating electric machine to decrease a torque generated from said first rotating electric machine.

3. The control device for a vehicle, according to claim 1, further comprising a power split device including a sun gear, a pinion gear engaging with said sun gear, a carrier supporting said pinion gear rotatably as desired, and a ring gear engaging with said pinion gear, wherein:
    said engine is coupled to said carrier;
    said first rotating electric machine is coupled to said sun gear; and
    said second rotating electric machine is coupled to said ring gear.

4. The control device for a vehicle, according to claim 1, wherein said rotating electric machine is a motor generator.

5. A control device for a vehicle, comprising:
an engine;
a first rotating electric machine coupled to the engine;
a second rotating electric machine coupled to the engine;
a battery;
a capacitor provided electrically in parallel with the battery;
means for calculating an output that the second rotating electric machine is required to provide;
means for calculating an output provided from the battery and the capacitor;
means for calculating an output of the first rotating electric machine by subtracting the output that the second rotating electric machine is required to provide from the output provided from the battery and the capacitor; and
control means for causing the battery and the capacitor to supply power to increase a number of rotations of the second rotating electric machine and also controlling the first rotating electric machine and the second rotating electric machine to prevent the first rotating electric machine from acting as a load of the engine when the vehicle is accelerated as a driving force of the engine is transmitted to a driving wheel, wherein the control means includes means for controlling the first rotating electric machine, as based on the output of the first rotating electric machine, to increase a number of rotations of the engine.

6. The control device for a vehicle, according to claim 5, wherein said control means further includes means responsive to said engine having attained a predetermined number of rotations, for controlling said first rotating electric machine to decrease a torque generated from said first rotating electric machine.

7. The control device for a vehicle, according to claim 5, further comprising a power split device including a sun gear, a pinion gear engaging with said sun gear, a carrier supporting said pinion gear rotatably as desired, and a ring gear engaging with said pinion gear, wherein:
said engine is coupled to said carrier;
said first rotating electric machine is coupled to said sun gear; and
said second rotating electric machine is coupled to said ring gear.

8. The control device for a vehicle, according to claim 5, wherein said rotating electric machine is a motor generator.

* * * * *